United States Patent
Wang et al.

(10) Patent No.: US 10,795,064 B2
(45) Date of Patent: Oct. 6, 2020

(54) GRATING ASSEMBLY, LIGHT SOURCE APPARATUS AND DRIVING METHOD OF THE SAME

(71) Applicants: BOE TECHNOLOGY GROUP CO., LTD., Beijing (CN); BEIJING BOE OPTOELECTRONICS TECHNOLOGY CO., LTD., Hefei, Anhui (CN)

(72) Inventors: Qian Wang, Beijing (CN); Xiaochuan Chen, Beijing (CN); Wenqing Zhao, Beijing (CN); Rui Xu, Beijing (CN); Lei Wang, Beijing (CN); Ming Yang, Beijing (CN); Pengcheng Lu, Beijing (CN); Jian Gao, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 88 days.

(21) Appl. No.: 15/528,416

(22) PCT Filed: Jun. 3, 2016

(86) PCT No.: PCT/CN2016/084701
§ 371 (c)(1),
(2) Date: May 19, 2017

(87) PCT Pub. No.: WO2017/166427
PCT Pub. Date: Oct. 5, 2017

(65) Prior Publication Data
US 2018/0196175 A1    Jul. 12, 2018

(30) Foreign Application Priority Data
Mar. 31, 2016    (CN) .......................... 2016 1 0196096

(51) Int. Cl.
*G02B 5/18* (2006.01)
*G02F 1/29* (2006.01)
*G02B 27/10* (2006.01)

(52) U.S. Cl.
CPC ............. *G02B 5/1814* (2013.01); *G02B 5/18* (2013.01); *G02B 5/1866* (2013.01); *G02B 27/1086* (2013.01); *G02F 1/29* (2013.01)

(58) Field of Classification Search
None
See application file for complete search history.

(56) References Cited

U.S. PATENT DOCUMENTS

| | | | | |
|---|---|---|---|---|
| 5,868,480 | A * | 2/1999 | Zeinali | G02B 5/201 345/32 |
| 2008/0074963 | A1* | 3/2008 | Nagatomi | G11B 7/1353 369/44.11 |

FOREIGN PATENT DOCUMENTS

| | | |
|---|---|---|
| CN | 102231020 A | 11/2011 |
| CN | 102243387 A | 11/2011 |

(Continued)

OTHER PUBLICATIONS

International Search Report datedDec. 30, 2016 corresponding to application No. PCT/CN2016/084701.

(Continued)

*Primary Examiner* — Darryl J Collins
*Assistant Examiner* — Journey F Sumlar
(74) *Attorney, Agent, or Firm* — Nath, Goldberg & Meyer; Joshua B. Goldberg

(57) ABSTRACT

The present disclosure, belonging to the field of display technology, provides a grating assembly, a light source apparatus and a driving method thereof, which can solve a problem that an existing light source cannot provide light with a controllable direction. The grating assembly of the present disclosure comprises: a diffraction grating divided (Continued)

into a plurality of sub-pixels, each sub-pixel being divided into a plurality of regions, the diffraction grating being configured to change light transmitted through each region into parallel light and cause light transmitted through different regions of a same sub-pixel to have different directions; and a selector divided into a plurality of sub-pixels corresponding to sub-pixels of the diffraction grating, each sub-pixel being divided into a plurality of regions corresponding to the regions of the sub-pixel of the diffraction grating, the selector being configured to control whether each region thereof transmits light or not.

18 Claims, 2 Drawing Sheets

(56) References Cited

FOREIGN PATENT DOCUMENTS

| | | |
|---|---|---|
| CN | 104460115 A | 3/2015 |
| CN | 105223641 A | 1/2016 |
| CN | 105589256 A | 5/2016 |
| CN | 105607172 A | 5/2016 |
| JP | 2000147225 A | 5/2000 |

OTHER PUBLICATIONS

Chinese office action dated Sep. 30, 2017 for corresponding CN application 201610196096.2 with English translation attached.

* cited by examiner

US 10,795,064 B2

GRATING ASSEMBLY, LIGHT SOURCE APPARATUS AND DRIVING METHOD OF THE SAME

TECHNICAL FIELD

The present disclosure belongs to the field of display technology, and in particular relates to a grating assembly, a light source apparatus and a driving method of the same.

BACKGROUND

Many existing display devices have strict requirements for incident light, and only if a direction of incident light is determined, a direction of emergent light can be correctly controlled to perform display.

However, a light source used in an existing display device can only provide light with a fixed direction, and cannot flexibly adjust the direction of light at different times, and thus cannot satisfy requirements of many display devices.

SUMMARY

In view of the problem that an existing light source cannot provide light with a controllable direction, the present disclosure provides a grating assembly capable of providing light with a controllable direction, a light source apparatus and a driving method of the same.

Technical solutions to solve the technical problem of the present disclosure include a grating assembly comprising:

a diffraction grating, which is divided into a plurality of sub-pixels, each sub-pixel being divided into a plurality of regions, the diffraction grating being configured to change light transmitted through each region into parallel light, and to cause light transmitted through different regions of a same sub-pixel to have different directions; and a selector, which is divided into a plurality of sub-pixels corresponding to the sub-pixels of the diffraction grating, each sub-pixel being divided into a plurality of regions corresponding to the regions of the sub-pixel of the diffraction grating, the selector being configured to control whether each region thereof transmits light or not.

Optionally, the grating assembly further comprises: a liquid crystal lens, wherein the selector and the diffraction grating are positioned on a same side of the liquid crystal lens; and the liquid crystal lens is divided into a plurality of sub-pixels corresponding to the sub-pixels of the diffraction grating, and is configured to control a direction of light transmitted through each sub-pixel thereof.

Optionally, each region of the selector is one liquid crystal switch.

Optionally, in one frame of image, the selector is configured to control the regions of each of the sub-pixels thereof to sequentially transmit light one by one.

Technical solutions to solve the technical problem of the present disclosure include a light source apparatus comprising:

a surface light source for emitting light; and the above grating assembly, located in front of a light emitting surface of the surface light source.

Optionally, the grating assembly is the above grating assembly comprising a liquid crystal lens, wherein the diffraction grating and the selector are positioned between the liquid crystal lens and the surface light source.

Optionally, the diffraction grating is a light transmitting plate, and a plurality of diffraction chutes parallel to each other are provided in each region thereof, wherein the diffraction chutes in a same region have a same chute angle, and the diffraction chutes in different regions of a same sub-pixel have different chute angles and/or extending directions.

Optionally, the surface light source includes a light guide plate and a blue light emitting device provided outside the light guide plate, the light guide plate is capable of emitting yellow light upon excitation by blue light; the diffraction chutes in each region of the diffraction grating include blue light diffraction chutes and yellow light diffraction chutes having different widths and respectively for converting transmitted blue and yellow light into light having a same direction.

Optionally, the selector is provided between the diffraction grating and the surface light source.

Optionally, each region of the selector is one liquid crystal switch.

Optionally, in one frame of image, the selector is configured to control the regions of each of its sub-pixels to sequentially transmit light one by one.

Technical solutions to solve the technical problem of the present disclosure include a driving method for a light source apparatus, wherein the light source apparatus is the above light source apparatus, and the driving method comprises:

emitting light by the surface light source; and controlling by the selector whether each region thereof transmits light or not.

Optionally, the light source apparatus is the above light source apparatus including a liquid crystal lens, and the driving method further includes:

allowing light emitted onto each sub-pixel thereof to transmit, and controlling a direction of the transmitted light, by the liquid crystal lens.

In the light source apparatus of the present disclosure, the diffraction grating converts irregular light, which is emitted from the surface light source into each sub-pixel, into multiple sets of parallel light that have different directions, and the selector independently controls whether these sets of light (light in each region) can be emitted out or not; therefore, a light exiting direction in each sub-pixel of the light source apparatus is controllable, and can satisfy requirements of various display devices.

The light source apparatus of the present disclosure is suitable for use as a light source of a display device.

DETAILED DESCRIPTION

In order to provide a better understanding of the technical solutions of the present disclosure to those skilled in the art, the present disclosure is described in further detail below in conjunction with the drawings and specific implementations.

First Embodiment

The present embodiment provides a grating assembly including:

a diffraction grating, which is divided into a plurality of sub-pixels, each sub-pixel being divided into a plurality of regions, the diffraction grating being configured to change light transmitted through each region into parallel light and to cause light transmitted through different regions of a same sub-pixel to have different directions; and a selector, which is divided into a plurality of sub-pixels corresponding to the sub-pixels of the diffraction grating, each sub-pixel being divided into a plurality of regions corresponding to the regions of the corresponding sub-pixel of the diffraction grating, and the selector being configured to control whether each region thereof transmits light or not.

Optionally, the grating assembly further includes a liquid crystal lens, wherein the selector and the diffraction grating are positioned on a same side of the liquid crystal lens; and the liquid crystal lens is divided into a plurality of sub-pixels corresponding to the sub-pixels of the diffraction grating, and is configured to control a direction of light transmitted through each sub-pixel thereof.

Optionally, each region of the selector is one liquid crystal switch.

Optionally, in one frame of image, the selector is configured to control each of the regions of the sub-pixels thereof to sequentially transmit light one by one.

The grating assembly of the present embodiment can be used in a light source apparatus, such that a light exiting direction of the light source apparatus is controllable, details of which are described in the following embodiment of a light source apparatus.

Second Embodiment

As shown in FIGS. 1 to 5, the present embodiment provides a light source apparatus.

The light source apparatus can provide light having a controllable direction, more specifically, each of its sub-pixels 9 may controllably emit parallel light towards multiple different directions, and thus the light source apparatus is applicable to various display devices.

Figure 1:
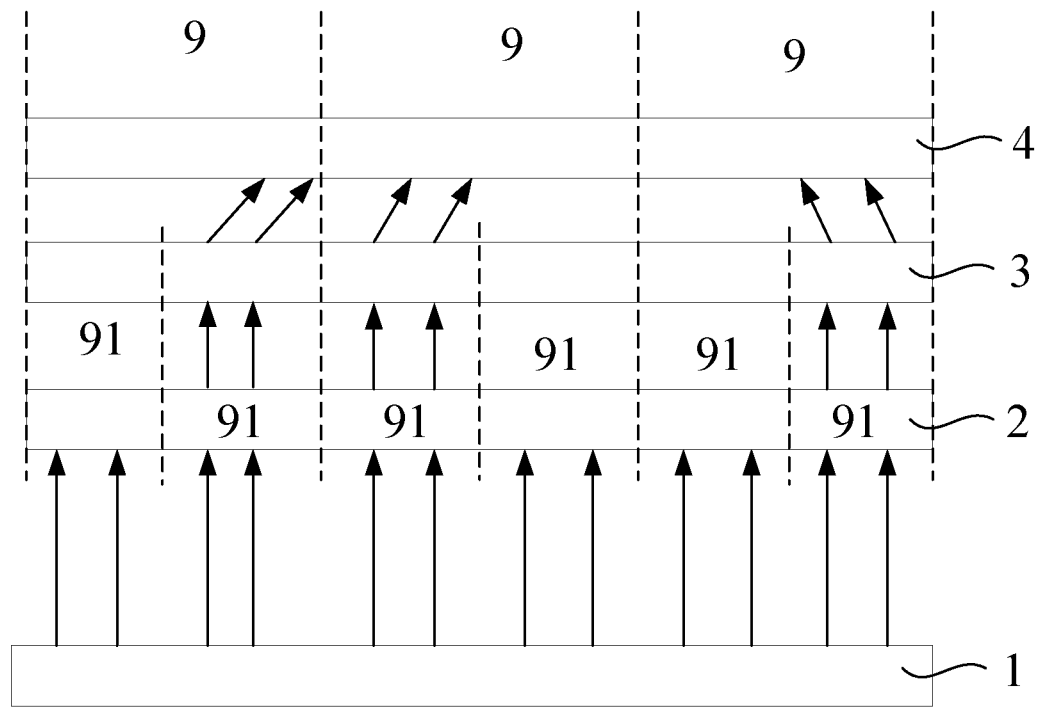
FIG. 1 is a schematic partial cross-sectional view of a structure of a light source apparatus according to an embodiment of the present disclosure.

As shown in FIG. 1, the light source apparatus includes the grating assembly of the first embodiment (which includes a selector 2 and a diffraction grating 3) and a surface light source 1, and the grating assembly is provided in front of a light emitting surface of the surface light source 1. That is, the light source apparatus includes:

a surface light source 1 for emitting light;

a diffraction grating 3 provided in front of a light emitting surface of the surface light source 1, wherein the diffraction grating 3 is divided into a plurality of sub-pixels 9, each sub-pixel 9 being divided into a plurality of regions 91, and the diffraction grating 3 is configured to change light transmitted through each region 91 into parallel light and cause light transmitted through different regions 91 of a same sub-pixel 9 to have different directions; and a selector 2 provided in front of the light emitting surface of the surface light source 1, wherein the selector is divided into a plurality of sub-pixels 9 corresponding to the sub-pixels of the diffraction grating 3, each sub-pixel 9 being divided into a plurality of regions 91 corresponding to the regions of the corresponding sub-pixel of the diffraction grating 3, and the selector 2 is configured to control each region 91 thereof to transmit light or not to transmit light.

The diffraction grating 3 and the selector 2 constitute the above-described grating assembly, and thus they are both located in front of the light emitting surface of the surface light source 1.

Figure 2:
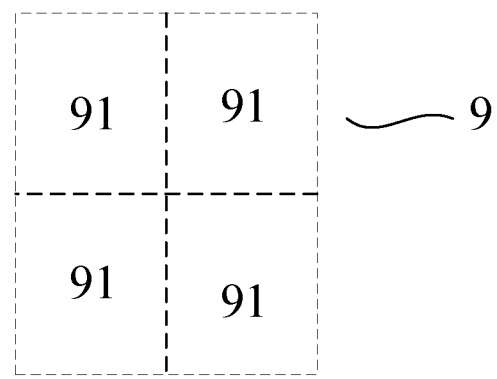
FIG. 2 is a schematic view of division of sub-pixels and regions of a light source apparatus according to an embodiment of the present disclosure.
Figure 3:
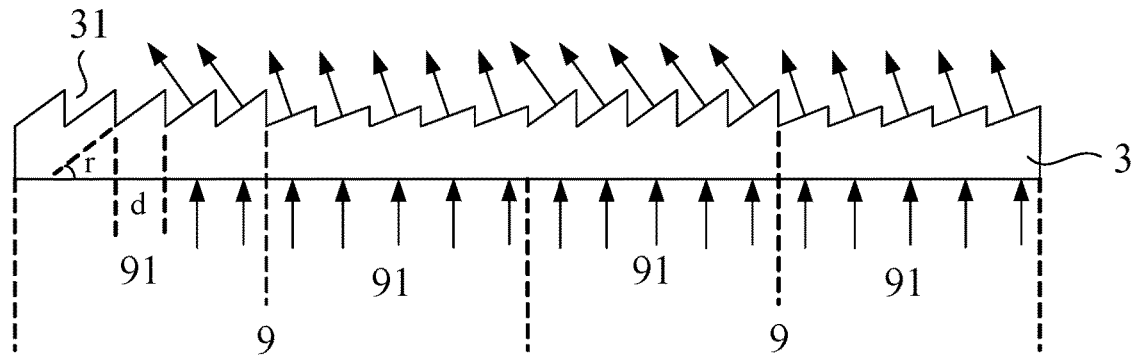
FIG. 3 is a schematic partial cross-sectional view of a structure of a diffraction grating in a light source apparatus according to an embodiment of the present disclosure.

A structure of the diffraction grating 3 is shown in FIG. 3, a function thereof is to convert light emitted thereon in different directions (for simplicity, incident light shown in the figure is in a same direction) into parallel transmitted light. The diffraction grating 3 of the present embodiment is divided into a plurality of sub-pixels 9, and each sub-pixel 9 corresponds to one smallest independently displayable "dot" in a display device, such as one red sub-pixel, green sub-pixel, blue sub-pixel or the like in the display device. As shown in FIG. 2, each sub-pixel 9 is further divided into a plurality of regions 91 (e.g., four regions 91 in the figure), the diffraction grating 3 has different structures in different regions 91 of one same sub-pixel 9. Therefore, the diffraction grating 3 of the present embodiment can convert light transmitted from a same region 91 (the incident light may be in various directions) into parallel light, and can assure that light transmitted through different regions 91 of each sub-pixel 9 has different directions, in other words, the diffraction grating 3 is configured to convert light transmitted from different positions of each sub-pixel 9 into multiple sets of parallel light having different directions.

The selector 2 has sub-pixels 9 and regions 91 corresponding to the sub-pixels and the regions of the diffraction grating 3 (of course, the sub-pixels 9 also correspond to sub-pixels of the display device), and may control each region 91 thereof whether to transmit light or not, that is, control whether parallel light in each region 91 of the diffraction grating 3 can be finally emitted out from the light source apparatus (or the grating assembly).

It can be seen that in the light source apparatus of the present embodiment, the diffraction grating 3 converts irregular light, which is emitted from the surface light source 1 towards each sub-pixel 9, into multiple sets of parallel light having different predetermined directions, and the selector 2 independently controls whether light in each region 91 can be emitted out or not; therefore, a light exiting direction of each sub-pixel 9 of the light source apparatus is controllable, and can satisfy requirements of various display devices.

Optionally, the grating assembly of the light source apparatus has a liquid crystal lens 4, and the selector 2 and the diffraction grating 3 are both located between the surface light source 1 and the liquid crystal lens 4.

That is to say, as shown in FIG. 1, optionally, the light source apparatus further includes a liquid crystal lens 4 provided in front of the diffraction grating 3 and the selector 2 (that is, at a side of the diffraction grating 3 and the selector 2 distal to the surface light source 1). The liquid crystal lens 4 is divided into a plurality of sub-pixels 9 corresponding to the sub-pixels of the diffraction grating 3, and is configured to control a direction of light transmitted through each sub-pixel 9 thereof. Specifically, the liquid crystal lens 4 includes a liquid crystal layer provided between two substrates, a driving electrode and a common electrode configured to drive the liquid crystal layer, and the like. By controlling voltages on the electrodes, liquid crystal molecules in the liquid crystal layer at corresponding positions can be twisted, thereby producing an effect similar to that of a "lens (or prism)" and changing a direction of transmitted light; of course, a specific degree, a direction or the like of the change may be further adjusted by changing voltages on the electrodes.

It can be seen that, as shown in FIG. 1, in the light source apparatus of the present embodiment, after light emitted by the surface light source 1 passes through the diffraction grating 3, light corresponding to each sub-pixel 9 is then converted into multiple sets of parallel light having different directions; and the selector 2 may control the parallel light corresponding to each region 91 of each sub-pixel 9 of the diffraction grating 3 whether to enter the liquid crystal lens 4 or not and when to enter the liquid crystal lens 4; after selected parallel light is emitted on a sub-pixel 9 of the liquid crystal lens 4 at a predetermined time, the liquid crystal lens 4 further changes its direction as required (light exiting direction may be different at different times), ensuring in the end that light with a desired direction can be emitted out from a desired position. Therefore, by providing the liquid crystal lens 4, further adjustment of light passing through the diffraction grating 3 can be achieved, such that not only a light existing position of the light source apparatus is controllable (that is, whether to emit out light is determined for each direction), but also a light exiting direction is changeable (that is, a direction of light emitted out from each region 91 of each sub-pixel 9 can be changed as required).

Figure 4:
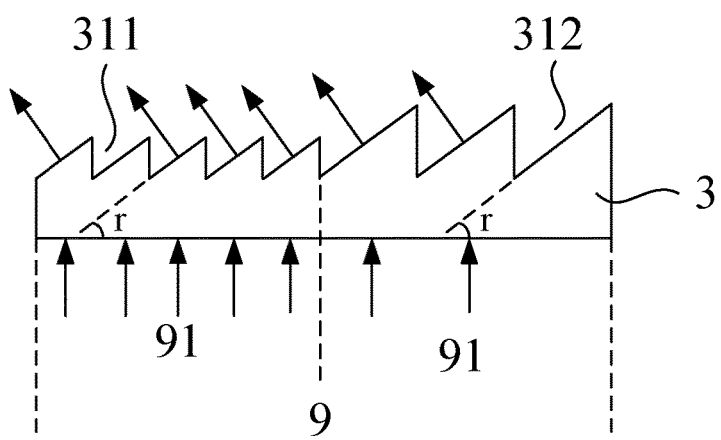
FIG. 4 is a schematic partial cross-sectional view of a structure of a diffraction grating in another light source apparatus according to an embodiment of the present disclosure.

Optionally, the diffraction grating 3 is a light transmitting plate, and each region 91 thereof is provided therein with a plurality of diffraction chutes 31 parallel to each other, wherein the diffraction chutes 31 in a same region 91 have a same chute angle r (the chute angle r is an included angle between a surface of the diffraction chute 31 and a lower surface of the diffraction grating 3), and the diffraction chutes 31 in different regions 91 of a same sub-pixel 9 have different chute angles r and/or extending directions (FIGS. 3 and 4 both show examples in which extending directions are the same, that is, the extending directions of the diffraction chutes 31 illustrated causes emergent light to be emitted "generally" towards the upper left (for example, as shown in FIGS. 3 and 4), thus it can be seen that difference in extending direction between diffraction chutes 31 of two regions 91 may cause a "general direction" of emergent light in one region to differ from a "general direction" of emergent light in the other region.

That is to say, as shown in FIG. 3, the diffraction grating 3 may be a light transmitting medium layer with a plurality of grooves (diffraction chutes 31). Since the diffraction chutes 31 have a size in the order of nanometers, when a particular condition is satisfied, the diffraction chutes 31 may enhance zero-order diffracted light due to diffraction effect, and convert light emitted into the diffraction grating 3 from multiple different directions into light emitted out in a direction perpendicular to the surface (inclined surface) of the diffraction chutes 31. In order that light emitted out from a same region 91 has a same direction, the diffraction chutes 31 in the same region 91 must have a same chute angle r and be parallel to each other; and in order that light emitted out from different regions 91 of one sub-pixel 9 have different directions, the diffraction chutes 31 in different regions 91 should have different chute angles r so as to change a "value of angle" of emergent light, or, the diffraction chutes 31 in different regions 91 should have different extending directions so as to change a "general direction" of emergent light.

Specifically, the condition to be satisfied to achieve the above conversion is: $2d \times \sin r = \lambda$, where $\lambda$ is a wavelength of the incident light, the chute angle r is an included angle between the surface of the diffraction chute 31 and the lower surface of the diffraction grating 3. Since a light exiting direction of each region 91 is determined, the chute angle r is determined, and the wavelength $\lambda$ of the incident light is also determined. Thus, a width d of the diffraction chute 31 in each region 91 (that is, a width of a vertical projection of the diffraction chute 31 on the lower surface of the diffraction grating 3) should be set according to the wavelength $\lambda$ and a desired chute angle r, which is not described in detail here.

Optionally, the surface light source 1 includes a light guide plate and a blue light emitting device (such as a blue LED) provided outside the light guide plate, and the light guide plate is capable of emitting yellow light upon excitation by the blue light; as shown in FIG. 4, the diffraction chutes 31 in each region 91 of the diffraction grating 3 include blue light diffraction chutes 311 and yellow light diffraction chutes 312 having different widths d and configured to convert transmitted blue light and yellow light into light having a same direction, respectively.

That is to say, the above surface light source 1 may employ an edge-type backlight source which is commonly used in liquid crystal display devices. The surface light source 1 mainly includes a light guide plate and a light emitting device (as well as an optical film layer such as a reflector, etc., of course). Light emitted by the light emitting device is emitted onto a side surface of the light guide plate, and is emitted out from a top surface of the light guide plate after undergoing a series of reflection, refraction and the like. However, in the surface light source 1 having the light guide plate, an LED emitting blue light (such as an organic light emitting diode) is commonly employed as an actual light emitting device, and the blue light emitted therefrom can also excite the light guide plate to general yellow light, such that emergent light becomes commonly desired white light by mixing the yellow light and the blue light. In this case, since wavelengths $\lambda$ of the yellow and blue light are different, and it is to be ensured that light of the two colors in one region 91 have a same light exiting direction (that is, the chute angles r are the same), the widths d of the diffraction chutes 31 corresponding thereto must be different. Therefore, as shown in FIG. 4, it is required to provide two types of diffraction chutes 31 having different widths d but same chute angles r in a same region 91 of the diffraction grating 3 (since the wavelength of the blue light is shorter, the width d of the blue light diffraction chutes 311 is necessarily smaller), for diffracting yellow light and blue light, respectively, and the yellow and blue light emitted out is mixed again to become parallel white light.

Optionally, the selector 2 is provided between the diffraction grating 3 and the surface light source 1.

As shown in FIG. 3, light has different transmission directions in different regions 91 after passing through the diffraction grating 3, thus light in two regions 91 may possibly overlap with each other. To avoid this phenomenon, preferably, the selector 2 is provided at a side of the diffraction grating 3 close to the surface light source 1, that is, light passes through the selector 2 first and is then emitted onto the diffraction grating 3, so as to ensure that light is emitted into desired regions 91 of the diffraction grating 3 only, thereby preventing overlapping of emergent light.

Optionally, each region 91 of the selector 2 is one liquid crystal switch.

That is to say, the selector 2 may employ a form of a liquid crystal switch.

Specifically, the selector 2 may include two substrates, and a liquid crystal layer and a plurality of driving electrodes respectively corresponding to the regions 91 are provided on inner sides of the two substrates, and polarizers (such as linear polarizers with polarization directions perpendicular to each other) are provided on outer sides of the two substrates, thus whether each region 91 transmits light or not by can be determined by controlling a voltage of each driving electrode. There are various specific forms of the liquid crystal switch, which are not described in detail here.

Optionally, in one frame of image, the selector 2 is configured to control the regions 91 of each sub-pixel 9 thereof to sequentially transmit light one by one.

Figure 5:
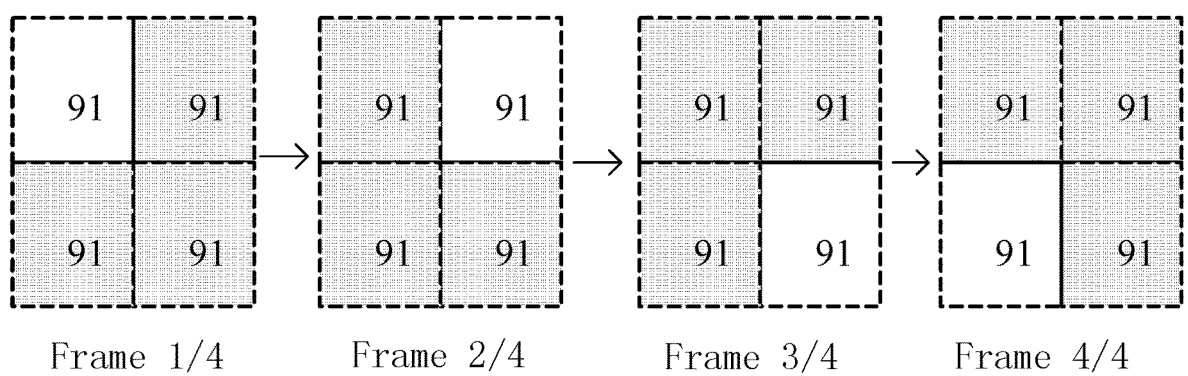
FIG. 5 is a schematic view of states, at different times within one frame of image, of regions of one sub-pixel of a selector in a light source apparatus according to an embodiment of the present disclosure.

That is to say, as shown in FIG. 5, when providing light for one frame of display image, the above selector 2 controls the regions 91 of each of its sub-pixels 9 to sequentially be in a light transmitting state one by one (in the figure, a dotted area represents non-light transmitting state, and an empty area represents light transmitting state), that is, in each of the sub-pixels 9, only one region 91 transmits light at any arbitrary time, and in one frame, each of the regions 91 of each of the sub-pixels 9 transmits light once. Accordingly, for the diffraction grating 3, in each of its sub-pixels 9, light emitted out from only one region 91 can be emitted into the liquid crystal lens 4 at any arbitrary time. Thus for the liquid crystal lens 4, parallel light having only one direction is emitted into each of its sub-pixels 9 at any arbitrary time, such that a light exiting direction can be controlled most precisely.

The light source apparatus of the present embodiment may control light emitted out from each sub-pixel 9 to be sequentially emitted towards multiple different directions in one frame of image. Therefore, a light exiting direction in each of the sub-pixels 9 in a display device using the light source apparatus can also be controllable. As long as a proportion of time when light emitted out from a certain sub-pixel 9 into human eyes in one frame of image is controlled, an energy density of light received by human eyes can be controlled, such that a human feels a change in brightness of the sub-pixel 9.

Third Embodiment

The present embodiment provides a driving method for the above light source apparatus, including:

emitting light by the surface light source 1, and controlling by the selector 2 whether each region 91 thereof transmits light or not.

Optionally, for the above light source apparatus having the liquid crystal lens 4, the driving method further includes:

allowing light emitted onto each sub-pixel 9 thereof to transmit and controlling a direction of the transmitted light, by the liquid crystal lens 4, 1.

That is, when driving the light source apparatus of the embodiment to emit light, the surface light source 1 may be caused to emit light continuously, and the time at which and the angle in which parallel light is emitted onto each of the sub-pixels 9 of the liquid crystal lens 4 are determined by the selector 2 and the diffraction grating 3, and the liquid crystal lens 4 then redirects the light towards a desired direction, so as to satisfy requirements of the display device.

It can be understood that the foregoing implementations are merely exemplary implementations used for describing the principle of the present disclosure, but the present disclosure is not limited thereto. Those of ordinary skill in the art may make various variations and modifications without departing from the spirit and essence of the present disclosure, and these variations and modifications shall fall into the protection scope of the present disclosure.

The invention claimed is:
1. A grating assembly, comprising:
a diffraction grating, which is divided into a plurality of sub-pixels, each sub-pixel being divided into four regions, the diffraction grating being configured to change light transmitted through any one of the four regions into parallel light and to cause light transmitted through different regions of the four regions of each sub-pixel to have different directions, each sub-pixel of the diffraction grating corresponds to one of a red sub-pixel, a green sun-pixel, and a blue sub-pixel of a display device;
a selector, which is divided into a plurality of sub-pixels each of which corresponds to one of the red sub-pixel, the green sun-pixel, and the blue sub-pixel of the display device, each sub-pixel of the selector being divided into four regions corresponding to the four regions of the corresponding sub-pixel of the diffraction grating, the selector being configured to control whether each region of the four regions of each sub-pixel of the selector transmits light or not; and
a liquid crystal lens, wherein the selector and the diffraction grating are positioned on a same side of the liquid crystal lens; the liquid crystal lens comprises a liquid crystal layer provided between two substrates, a driving electrode and a common electrode configured to drive the liquid crystal layer, and the liquid crystal lens is divided into a plurality of sub-pixels corresponding to the sub-pixels of the diffraction grating, and is configured to control a direction of light transmitted through each sub-pixel of the liquid crystal lens,
wherein the selector, the diffraction grating and the liquid crystal lens are arranged in sequence along a light-emitting direction; and
wherein orthographic projections of the four regions of each sub-pixel of the diffraction grating on the selector completely overlap the four regions of the corresponding sub-pixel of the selector.
2. The grating assembly according to claim 1, wherein each region of the selector is one liquid crystal switch.
3. The grating assembly according to claim 1, wherein in one frame of image, the selector is configured to control the regions of each of the sub-pixels thereof to sequentially transmit light one by one.
4. A light source apparatus, comprising:
a surface light source to emit light; and
the grating assembly according to claim 1, the grating assembly being located in front of a light emitting surface of the surface light source.
5. The light source apparatus according to claim 4, wherein both the diffraction grating and the selector are positioned between the liquid crystal lens and the surface light source.
6. A driving method for a light source apparatus, wherein the light source apparatus is the light source apparatus according to claim 5, and the driving method comprising:
emitting light by the surface light source; and
controlling by the selector whether each region thereof transmits light or not.
7. The driving method according to claim 6, wherein both the diffraction grating and the selector are positioned between the liquid crystal lens and the surface light source, and the driving method further includes:
allowing light emitted onto each sub-pixel thereof to transmit, and controlling a direction of the transmitted light, by the liquid crystal lens.
8. The light source apparatus according to claim 4, wherein the diffraction grating is a light transmitting plate, and a plurality of diffraction chutes parallel to each other are provided in each region thereof, wherein the diffraction chutes in a same region have a same chute angle, and the diffraction chutes in different regions of a same sub-pixel have different chute angles and/or extending directions.

9. The light source apparatus according to claim 8, wherein
the surface light source includes a light guide plate and a blue light emitting device provided outside the light guide plate, the light guide plate is capable of emitting yellow light upon excitation by blue light;
the diffraction chutes in each region of the diffraction grating include blue light diffraction chutes and yellow light diffraction chutes having different widths, to convert transmitted blue and yellow light into light with a same direction, respectively.

10. A driving method for a light source apparatus, wherein the light source apparatus is the light source apparatus according to claim 9, and the driving method comprising:
emitting light by the surface light source; and
controlling by the selector whether each region thereof transmits light or not.

11. The driving method according to claim 10, wherein both the diffraction grating and the selector are positioned between the liquid crystal lens and the surface light source, and the driving method further includes:
allowing light emitted onto each sub-pixel thereof to transmit, and controlling a direction of the transmitted light, by the liquid crystal lens.

12. A driving method for a light source apparatus, wherein the light source apparatus is the light source apparatus according to claim 8, and the driving method comprising:
emitting light by the surface light source; and
controlling by the selector whether each region thereof transmits light or not.

13. The driving method according to claim 12, wherein both the diffraction grating and the selector are positioned between the liquid crystal lens and the surface light source, and the driving method further includes:
allowing light emitted onto each sub-pixel thereof to transmit, and controlling a direction of the transmitted light, by the liquid crystal lens.

14. The light source apparatus according to claim 4, wherein
the selector is provided between the diffraction grating and the surface light source.

15. The light source apparatus according to claim 4, wherein
each region of the selector is one liquid crystal switch.

16. The light source apparatus according to claim 4, wherein
in one frame of image, the selector is configured to control the regions of each of its sub-pixels to sequentially transmit light one by one.

17. A driving method for a light source apparatus, wherein the light source apparatus is the light source apparatus according to claim 4, and the driving method comprising:
emitting light by the surface light source; and
controlling by the selector whether each region thereof transmits light or not.

18. The driving method according to claim 17, wherein both the diffraction grating and the selector are positioned between the liquid crystal lens and the surface light source, and the driving method further includes:
allowing light emitted onto each sub-pixel thereof to transmit, and controlling a direction of the transmitted light, by the liquid crystal lens.

* * * * *